Jan. 23, 1934.  D. B. BAKER ET AL  1,944,393
TRACKLAYING TRACTOR
Filed May 14, 1932  2 Sheets-Sheet 1

Inventors
David B. Baker,
Clifford R. Rogers,
and Norman O. Panzegrau
By H. P. Doolittle
Atty.

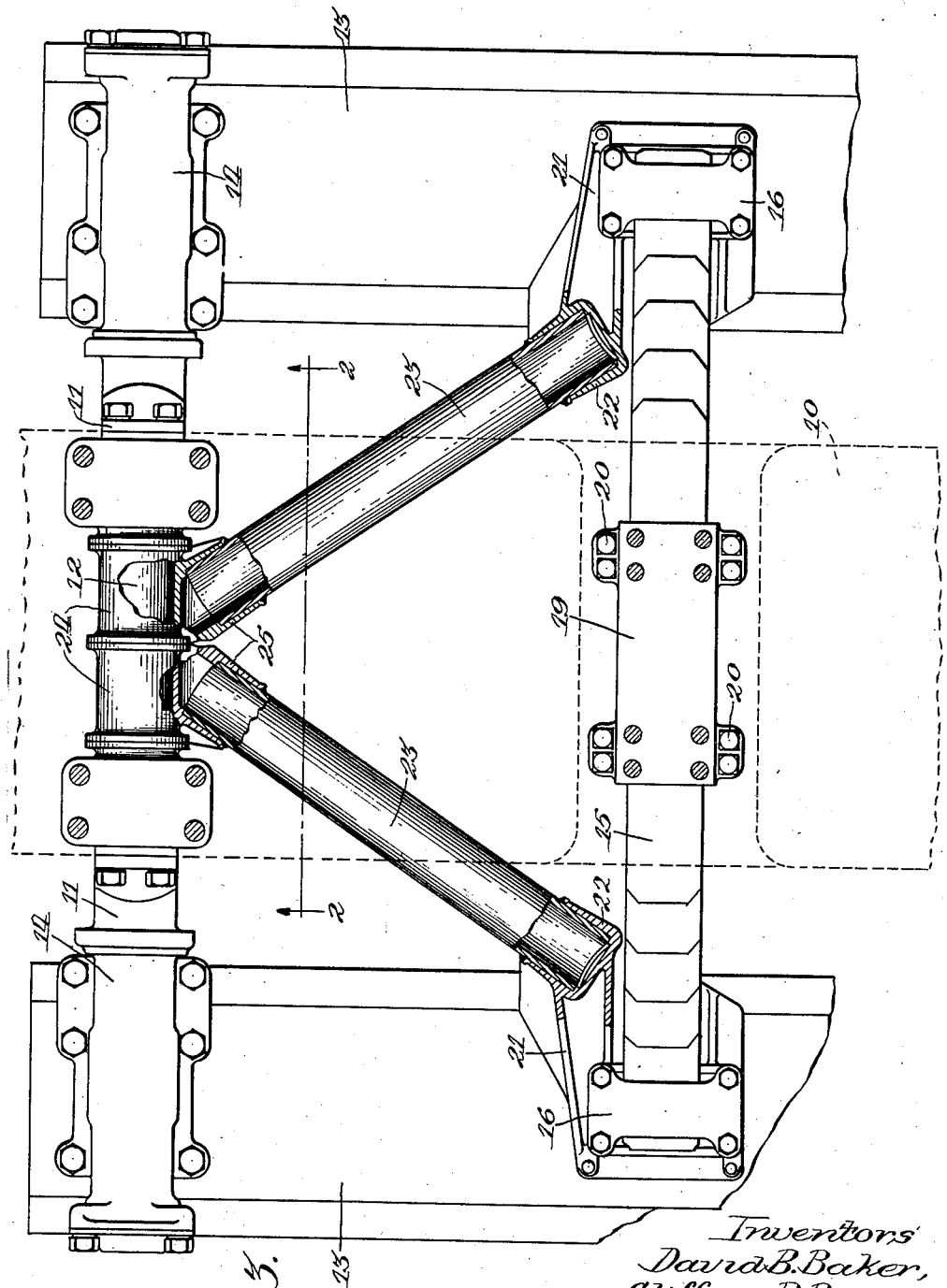

Patented Jan. 23, 1934

1,944,393

UNITED STATES PATENT OFFICE 1,944,393

TRACKLAYING TRACTOR

David B. Baker, Riverside, Clifford R. Rogers, Oak Park, and Norman O. Panzegrau, Chicago, Ill., assignors to International Harvester Company, a corporation of New Jersey Application May 14, 1932. Serial No. 611,274

3 Claims. (Cl. 305—9)

This invention relates to track laying tractors. More specifically it relates to track frame constructions and to means for stabilizing the track frames.

The principal object of the invention is to provide in a track laying tractor having track supporting means pivotally mounted at the sides thereof, means for maintaining the track frames in position for up and down movement about their axes and to prevent lateral movement of the frames with respect to each other and to the main frame of the tractor.

Other objects, subsidiary to this main object, such as the particular means employed and the relative positions of the bracing means, will be apparent from the detailed description to follow.

The objects are accomplished by providing bracing means rigidly secured to the track frames at points forwardly of their pivot axis on the main frame and pivotally securing said braces to the main frame of the tractor on an axis coincident with the pivot axes of the track frames.

Figure 1:
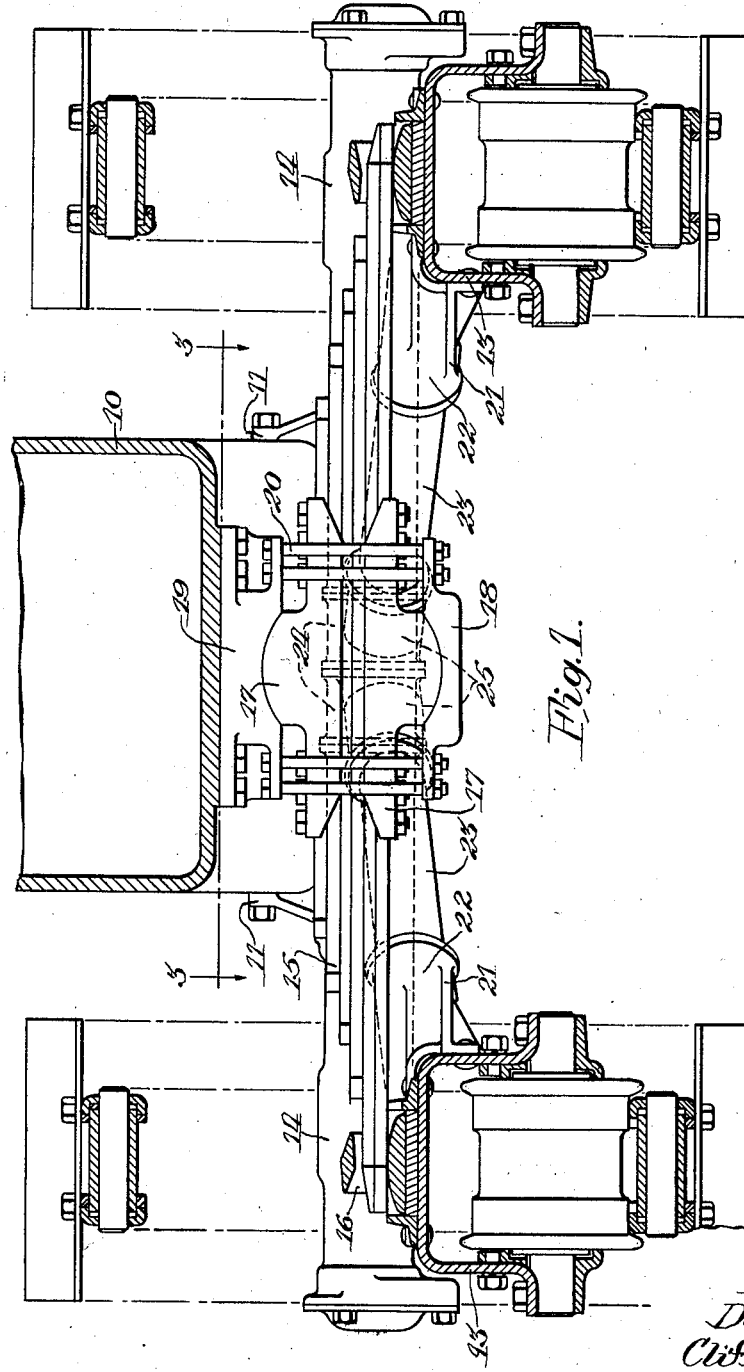
Figure 1 is a sectional view through the mid-portion of a track laying tractor, such as shown in United States Patent No. 1,503,615, in which the invention has been embodied. In this figure only a portion of the main frame and such details of construction as are necessary to illustrate the invention have been shown.
Figure 2:
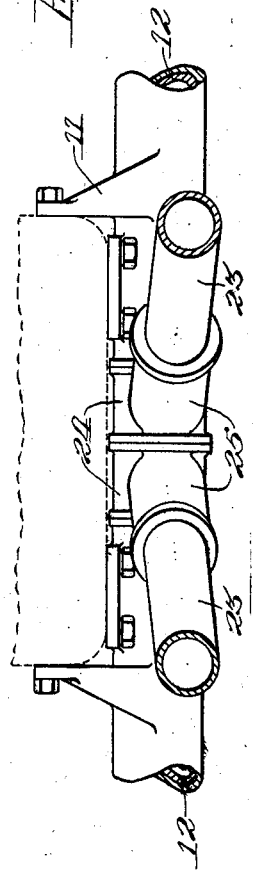
Figure 2 is a section taken on the line 2—2 of Figure 3, showing the connecting means of the transverse track carrying shaft and the bracing members with the main frame of the tractor, which is shown in dotted lines.

Figure 3 may be considered as a section taken on the line 3—3 of Figure 1. It is to be understood that only certain portions of the track frames are shown in this figure; also the tractor body or main frame is shown in dotted lines.

The main frame of the tractor is of a conventional construction, being cast integrally as a unitary structure. Tractors of this type, such as shown in the patent previously referred to, are in wide use and the details of construction are very well known. Such tractors are usually spoken of as having 3-point suspension; that is, the two points of connection of the track frames at the rear of the tractor and the support at the front of the tractor on the cross member, which is, in turn, mounted on the track frames.

As illustrated, a pair of brackets 11 are rigidly secured to the main frame of the tractor for supporting a transverse shaft 12. Said shaft extends laterally beyond the sides of the tractor and provides means for pivotally connecting the track frames 13. Bearing members 14, rigidly secured to the track frames, are pivotally mounted on the ends of the shaft 12 and are held against axial displacement with respect thereto by suitable securing means. Forwardly of the bearing members 14, means are provided for mounting the transverse support 15, which is shown as a laminated spring. Said members consist of a transversely slotted support 16 through which the ends of the spring 15 extend. The support is shaped to present a rounded bearing surface to the spring to permit free sliding and pivoting action.

It will be understood that this construction permits lateral movement of the spring ends with respect to the supports. The spring 15 at its center is clamped between a pair of members 17, which are formed with cylindrical bearing faces above and below the spring. Said bearing faces engage the mating portions of the lower bearing cap 18 and an upper bearing block 19 which is rigidly secured to the main frame 10 of the tractor. Bolts 20 secure the bearing cap in position with respect to the bearing block, whereby the spring is held to permit angular movement about a longitudinal axis and a limited movement of translation fore and aft of the tractor. The supports 16 for the spring ends on the track frames include members 21. Each of said members is provided with an angularly extending portion 22 directed rearwardly toward the center of the tractor. Each of said portions 22 is formed with a bore which receives one end of a hollow shaft or pipe 23. The shaft may be secured to the portion 22 by welding or by any other suitable means.

The brackets 11 which support the the transverse shaft are spaced apart and a pair of members 24 are pivoted on the shaft between said brackets, said members abutting the brackets at their outer ends and abutting each other on the center line of the tractor. Each of the members 24 is provided with an angularly extending portion 25 directed forwardly and outwardly. Said portions are provided with bores which receive the ends of the hollow shafts 23. Said shafts are rigidly secured to said extending portions. The members 24, the pipes 23, and the members 21 form braces which are rigidly connected to the track frames and are pivotally connected to the main frame on an axis in alignment with the axis of attachment of the track frames. This is obvious as the track frames and the braces are connected on the same shaft.

110

The operation of a track laying tractor embodying the invention will be clear from the detailed description. As the track frames rock up and down about their pivot axis, that is, about the shaft 12, the transverse support 15 rocks about a longitudinal axis provided by its connecting means on the main frame. As the member 15 assumes angular positions, its ends describe arcs and the over-all transverse dimension is shortened. When this action takes place, the ends of the support slide over the grounded bearing surfaces provided by the supports 16. As is well known in constructions of this type, there is also a shortening of the longitudinal distance of the contacting point of the track frame with the transverse support. In the particular construction illustrated, this is provided for by mounting the support 15 on the track frame for longitudinal movement whereby it may move rearwardly to prevent binding of the ends with the supports on the track frames.

To secure the track frames in proper position, that is, to prevent lateral movement thereof with respect to the main frame and also to prevent undue strain on the pivotal connections of the frames with the main frame, the braces are provided. Said braces, which, as previously stated, are made up of the members 21, the pipes 23 and the members 24, are connected forwardly of the pivot axis a sufficient distance to obtain a proper bracing effect. The braces are also connected laterally a sufficient distance from the pivotal connections of the track frames on the main frame to secure a sufficient bracing effect. It is necessary, of course, that the braces be pivoted on the same axis as the track frames. In the construction shown, this is provided for by pivoting the braces on the same shaft. The braces are of sufficient strength due to their construction and the positions at which they are located, to secure the track frames in position against lateral movement while permitting free up and down movement of the forward ends thereof.

It is understood that applicant has shown only a preferred construction of his improved stabilizing means for track laying tractors and that he claims as his invention all modifications falling within the scope of the appended claims.

What is claimed is:

1. In a track laying tractor having a main frame, and in combination therewith track frames pivotally connected on a transverse axis at their rear ends to the rear end of the main frame, attaching members rigidly mounted at the forward ends of the track frames, a transverse support for the main frame pivotally connected to said members, braces rigidly connected to the members and extending rearwardly and inwardly, and means for pivotally connecting the rear ends of said braces to the main frame adjacent the center line thereof and in transverse alignment with the pivot axis of the track frames.

2. In a track laying tractor having a main frame, and in combination therewith track frames pivotally connected on a transverse axis at their rear ends to the rear end of the main frame, attaching members rigidly mounted at the forward ends of the track frames, a transverse support for the main frame pivotally connected to said members, and braces pivotally connected to the main frame at their rear ends on an axis in alignment with the pivot axis of the track frames and rigidly connected to the attaching members adjacent the connections therewith of the transverse support, the rear ends of said braces being closely adjacent each other on the center line of the main frame whereby a triangle is formed by the braces and the transverse support.

3. In a track laying tractor having a main frame, and in combination therewith a transverse shaft secured to the main frame at the rear thereof, track frames pivotally mounted on said shaft at the sides of the main frame and extending forwardly therefrom, supporting members mounted adjacent the forward ends of the track frames, a transverse support extending under the main frame for supporting the same and pivotally mounted on the supporting members, and oppositely angled brace members pivotally connected to the transverse shaft near the center line of the main frame and rigidly connected to the supporting members at points adjacent the connections of the transverse support whereby a triangle arrangement is formed by the transverse support and the bracing members.

DAVID B. BAKER.
CLIFFORD R. ROGERS.
NORMAN O. PANZEGRAU.